United States Patent
Mann et al.

(10) Patent No.: US 6,483,915 B1
(45) Date of Patent: Nov. 19, 2002

(54) EQUIPMENT AND PROCESSES FOR ECHO SUPPRESSION WITH ADAPTIVE FIR FILTERS

(75) Inventors: Armin Mann, Stuttgart (DE); Hans Jürgen Matt, Remseck (DE); Michael Walker, Baltmannsweiler (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/231,793

(22) Filed: Jan. 15, 1999

(30) Foreign Application Priority Data

Jan. 16, 1998 (DE) ......................................... 198 01 390

(51) Int. Cl.[7] .............................................. H04M 9/08
(52) U.S. Cl. ............................ 379/406.01; 379/406.02; 379/406.04; 379/406.05; 379/406.06; 379/406.08; 379/406.09
(58) Field of Search ................................. 379/400–412

(56) References Cited

U.S. PATENT DOCUMENTS

| | | | | |
|---|---|---|---|---|
| 5,428,605 A | * | 6/1995 | Andre | 379/410 |
| 5,513,265 A | * | 4/1996 | Hirano | 379/406 |
| 5,553,137 A | * | 9/1996 | Nyhart et al. | 379/410 |
| 5,570,423 A | | 10/1996 | Walker et al. | |
| 5,790,632 A | * | 8/1998 | Antonio et al. | 379/406 |
| 5,828,756 A | * | 10/1998 | Benesty et al. | 379/410 |
| 5,856,970 A | * | 1/1999 | Gee et al. | 379/406 |
| 6,134,322 A | * | 10/2000 | Hoege et al. | 379/406 |
| 6,185,300 B1 | * | 2/2001 | Romesburg | 379/406 |

FOREIGN PATENT DOCUMENTS

| | | |
|---|---|---|
| DE | 3431 141 A1 | 3/1986 |
| DE | 43 05 256 A1 | 8/1994 |
| DE | 44 30 189 A1 | 2/1996 |
| DE | 197 14 233 A1 | 11/1997 |
| EP | 0 627 825 A2 | 12/1994 |
| EP | 0 746 134 A2 | 12/1996 |
| EP | 0 758 830 A2 | 2/1997 |
| EP | 0 792 029 A2 | 8/1997 |

* cited by examiner

*Primary Examiner*—Forester W. Isen
*Assistant Examiner*—Ramnandan Singh
(74) *Attorney, Agent, or Firm*—Sughrue Mion, PLLC

(57) ABSTRACT

An equipment (1) for the suppression of whole echoes composed of several partial echoes in telecommunications (TC) equipment, such as end devices, transmission systems or exchange equipment, with the help of adaptive FIR (=Finite Impulse Response) filters, which reproduce the whole echo and extract it from the echo-laden useful signal and which has been transferred to the respective TC equipment, in which the homogeneous FIR filters or partial filters (10), each of which are able to reproduce a whole echo or partial echo, are implemented on a single ASIC (=Application Specific Integrated Circuit) (9) for the m parallel and independent TC channels n to be served; and in which the whole echoes or partial echoes to be reproduced can be calculated in real time in the ASIC (9) and in which a digital signal processor (4) is designed to control the ASIC (9) and set the filter settings, especially after the coefficient required to reproduce the echo is calculated on the ASIC (9). This calculation is carried out in the digital signal processor (4). This makes it possible to effectively suppress echoes in a large number of m parallel and independent TC channels, as they must be processed in exchanges and network hybrids, without requiring a large amount of memory space and computational effort.

21 Claims, 5 Drawing Sheets

EQUIPMENT AND PROCESSES FOR ECHO SUPPRESSION WITH ADAPTIVE FIR FILTERS

This application is based on and claims priority from German Patent Application No. 198 01 390.6 filed Jan. 16, 1998, which is incorporated herein by reference.

BACKGROUND OF THE INVENTION

The invention involves equipment and a procedure for the suppression of whole echoes comprised of several partial echoes in telecommunications (TC) equipment, such as end devices, transmission systems or switching equipment, with the help of adaptive FIR (=Finite Impulse Response) filters, which reproduce the whole echo and extract it from the useful signal impeded by the echo, which has been transmitted to the respective TC equipment.

Such a procedure and equipment for adaptive echo compensation is known from the German patent DE 44 30 189 A1.

With the transfer of speech signals via telecommunication lines, acoustic echoes can originate either on the "near end" from the user sending out the signal due to direct sound transfer from the loudspeaker to the microphone of the end device. The "near echo" problem is considerably intensified when several end devices are set up closely together, for example in an office or a conference room with multiple telephone connections since there is a coupling from each loudspeaker signal to each microphone. The multi-channel echo suppression procedure and the associated electronic circuit proposed in the EP 0 627 825 A2 should help in this case. In addition to the near acoustic echo, it is possible that a composite electric line echo is also created from a great variety of partial echoes due to the reflections of the speech signals sent out to positions which are varying distances away in the transmission channel, for example in the case of 2–4 wire hybrids (hybrid circuits) in the end device or in the exchanges and at network interconnections. In this case it is usually so-called "short distance echoes" which are reflected back to the speaker in a time period up to 128 ms. These short distant echoes are differentiated from long distance echoes, which come back to the speaker in a timeframe of up to 640 ms and are especially disturbing due to the large time delay since in the meantime the speaker is already considerably advanced in his speech by the time his own reflected speech signal reaches him again. Such delayed long distance echoes occur for example during intercontinental calls, or during long distance telephone calls transmitted via deep-sea cables or satellites. The network operators which maintain such telephone networks are therefore especially interested in suppressing long distance echoes with large time delays, but also short distance echoes reflected back with higher intensities as effectively as possible.

To this end, for example in EP 0 792 029 A2, echo suppression equipment with an adaptive filter is proposed, including a coarse and a fine detector for near end speech signals which are set up on both sides of the echo suppression equipment and are consequently able to monitor the incoming signal before and after the echo suppression.

An adjustment to the reflected echo value should be carried out in speech pauses on the near end.

DE 44 30 189 A1 quoted at the beginning proposes a cost-efficient procedure which can be used under various acoustic conditions, and which uses a FIR filter whose filter coefficients are determined using the NLMS algorithms. According to this method, echo suppression in a TC network with multiple parallel channels utilizes an adaptive FIR filter for each channel, which is realized in software on a digital signal processor. The adaptive FIR filter is supposed to reproduce the expected whole echo, which may be composed of several individual partial echoes and extract it from the useful signal which has been transmitted to the TC end device and is impeded by the echo.

SUMMARY OF THE INVENTION

In contrast, the purpose of the present invention is to develop the procedure and equipment of the type indicated at the beginning to the point of enabling the effective suppression of echoes, without a large amount of storage space and computational effort, even for a large number of m parallel TC channels which are independent of each other, for example as they are in exchanges.

In accordance with the present invention, this task is solved in that for m parallel, independent TC channels to be served, n homogeneous FIR filters or partial filters, each of which can reproduce a whole or partial echo, are implemented on a single ASIC (=Application Specific Integrated Circuit), whereby m, n ∈ N and especially n≧2; that the whole or partial echoes to be reproduced can be calculated in real time on the ASIC; and that there are provisions for a digital signal processor (=DSP) which controls the ASIC and can carry out the filter settings in the ASIC, especially after the coefficients and time-delays required to reproduce the echo have been calculated in the DSP.

Through the high integration density of an ASIC, the equipment in accordance with the present invention can be kept especially compact. Since the digital signal processor is quite considerably relieved through the integration of the FIR filter on the ASIC, many more parallel TC channels can be served with constant processor effort with effective echo suppression. This allows for the processing of larger time delays in the echoes (for example up to 640 ms), multiple individual echoes for each whole echo and many parallel channels (>2000) with minimal effort.

More advantageously, a number of FIR partial filters are cascaded in order to reproduce a whole echo. At present the demands of TC network operators call for three to five partial echoes to be suppressed per channel. However, this could still increase in the future.

It is especially preferred that the equipment in accordance with this invention be designed in such a way that a variable subset of FIR partial filters can be assigned to a TC channel to be served, as required, depending on the number of partial echoes as well as the size of the delay times. Through this flexible assignment of FIR filters per processed channel according to the number of individual echoes and according to the size of the delay times between the signal and echo, the ASIC can be of an extremely compact design despite the very high number of channels.

An advantageous advanced set-up distinguishes itself in that there are provisions for a macrocell for each FIR partial filter in the ASIC. This macrocell includes a shift register of suitable length for the temporary storage of the sampled speech signals, demultiplexer equipment for setting the effective shift register length, as well as adding equipment for the summation of the sample value weighted with the appropriate coefficients. These macrocells can be precisely the same construction, which simplifies the manufacture of an ASIC with many homogeneous FIR partial filters and therefore makes it less expensive.

It is especially easy to have a cascading of several macrocells that enables any choice of flexible interconnections, for example for reproducing a whole echo, and therefore an especially high capacity utilization ratio of the macrocells.

A preferred advanced set-up provides for a macrocell including one of the coefficient memories approximated by the digital signal processor, which can be directly read by a modulo N counter as well as a digital multiplier unit with an operating frequency of $f_A = N \cdot f_S$, to which the appropriate coefficients from the coefficient memory and the appropriate sample values from the shift register are fed for multiplication, in which case the sample values with a sampling frequency of $f_S$ have been stored in the shift register. There are provisions for an adder which adds the product values output by the digital multiplier unit to each of the sums of the preceding product values stored in an initial temporary memory via a feedback loop and which can finally be extracted from the useful signal impeded by an echo, which has been stored in a second temporary memory as the reproduced partial echo signal and transmitted to the TC equipment. This type of construction only requires a single multiplier, which replaces an appropriate number of multipliers in the conventional FIR partial filters for the processing of N. The operating frequency $f_A$ increased by the factor N in comparison to the operating frequency $f_S$ is no problem with the standard electronic component parts available today, provided that N moves in the magnitude of 50–100.

One especially effective form of the equipment in accordance with the present invention provides for several coefficient memories, which can all be read by means of a demultiplexer, whereby each of the TC channels to be served can be assigned appropriate coefficient memory, and in which the suppression of echoes on all TC channels can take place via a single FIR whole filter consisting of several FIR partial filters, which can be switched to the multiplex mode.

Preferred is another design in which there are provisions for a storage device, preferably a RAM (=Random Access Memory), in which the current sampled speech signals which have been transmitted from the TC equipment can be stored, as well as the coefficients belonging to the reproduced partial echoes, and in which there are provisions for a control unit, preferably integrated into the ASIC, which administers the process of echo suppression by means of an address calculation of data stored in the storage unit, the DSP and the FIR partial filters on the ASIC. In this way, the coefficient memories and sample value memory can be taken from storage in the ASIC and packed on an extremely inexpensive RAM which is available in high density. The shift register is also eliminated in the design described above.

The control unit essentially controls the process of the data flow, so that very little hardware is necessary for realizing the echo suppression equipment and the controlling digital signal processor is relieved to a large degree, since it essentially only has to carry out the calculation of the coefficients, preferably for several independent TC channels.

Especially preferred is an advanced design of this equipment in which the time demultiplex procedure m serves independent TC channels. In this form, the address calculation in the control unit replaces the multiplex units from the designs described further above.

In another preferred design of the equipment in accordance with the present invention, there are also provisions for equipment in the recognition of non-speech signals on a TC channel, especially for the detection of modem or fax signals. In this case, the echo suppression function can be turned off automatically for non-speech signals, which increases the lack of distortion of fax and modem connections.

Another advanced design of this form provides for equipment in the recognition of non-speech signals in which a discrete Fourier transformation (=DFT), especially a Goertzel algorithm, is implemented. This requires especially little storage area and computational capacity for this additional function.

Moreover, in another advanced design of this form, there is a compander circuit for masking line echoes. This makes the echo suppression even more effective, and therefore comfort for the end user as well.

The compander circuit can also be realized on an ASIC, preferably on the same ASIC as the FIR filter. The hardware units are therefore especially compact and inexpensive to produce.

Within the framework of the present invention, there is also a process for the operation of echo suppression equipment in accordance with the present invention in which a Dirac impulse is sent to the corresponding TC channel, on which the echo answer is detected and the suitable coefficients for reproducing the whole echo are calculated and stored for the corresponding FIR filter.

In other process variants, defined analog noise signal sequence is sent to the appropriate TC channel instead of the Dirac impulse, the echo answer on it is detected and the suitable coefficients for reproducing the whole echo are calculated and stored. The duration of sending out the noise signal sequence is normally less than a second.

Particularly preferred is an advanced design of this process variation in which the analog noise signal-sequence includes a Gaussian noise signal limited to the bandwidth of the TC channels to be served.

Another alternative process variation is distinguished from other variants in that a synthetic, preferably ternary pseudo-noise sequence is sent to the corresponding TC channel, the echo answer on it is detected, and suitable coefficients for reproducing he whole echo are calculated and stored. The pseudo noise sequence is usually selected in such a way that only the main value of the sequence shows a correlation value q while the secondary values have the correlation value 0.

It is particularly preferred that coefficients for reproducing the echo are gathered from the correlation of the echo signals that have been sent to those which have been received.

Also preferred is an advanced design of the procedure in accordance with this invention in which an NLMS (=Normalized Least Mean Square) algorithm is used for the calculation of the filter coefficients for the calculation of the coefficients from the received echo signals in the knowledge of the signals sent out. In this process, the CPU time and computational effort necessary for attaining a satisfactory result is kept especially small. In this case, the length of the noise sequence is advantageously adjusted to the length of the FIR filter.

In another process variation, the whole echo composed of all the partial echoes to be considered is put together on the ASIC and is extracted as a whole from the useful signal transmitted to the TC equipment. In this case, only one position of the incoming signal on the TC channel to be served is affected.

Alternatively, the partial echoes to be considered can be reproduced in the ASIC and individually extracted from the useful signal transmitted to the TC equipment. In this way, the design of the hardware and computer units in accordance with the design of the present invention is kept flexible.

Additional advantages of the invention can be seen from the description and sketches. The features mentioned above and described further in accordance with this invention can also be used separately or in any desired combination. The designs shown and described here are not to be understood as a complete list, but rather as exemplary features as an illustration of the invention.

BRIEF DESCRIPTION OF THE DRAWING

The invention is presented in the sketches and is explained in more detail using examples of implementation.

DETAILED DESCRIPTION OF THE INVENTION

Figure 1:
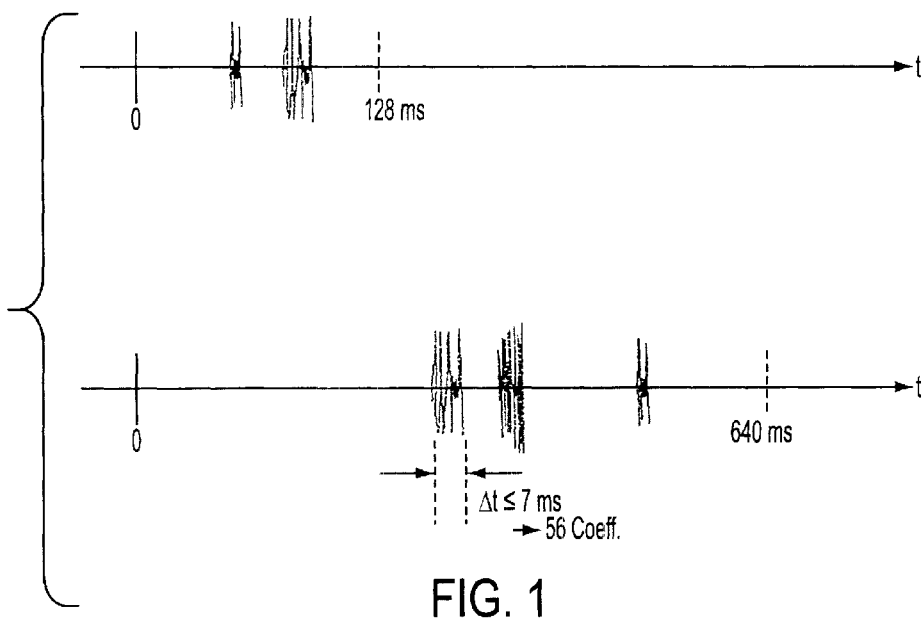
FIG. 1 shows in the upper half the temporal course of a typical short distance echo sequence with two partial echoes and in the lower half a long distance echo sequence with three partial echoes.

The temporal course of a series of short distance partial echoes is illustrated in the upper part of FIG. 1, which by definition shows a delay time of up to 128 ms as compared to the time when the signal was sent out from the corresponding TC user. Such line echoes occur at exchanges, network hybrids and other types of nodes in the network through reflection. However, they are not disturbing if no noticeable delay time (a magnitude of 10 ms) has passed since the original signal was sent out, since the speaker using the TC end device also perceives a certain echo effect through acoustic echoes in the area around him or perceives his own body sound in his head and nearly automatically "compensates for it," since he is accustomed to it.

The line echoes become very problematic indeed if there are delay times larger than 30 ms, which is represented in the lower part of FIG. 1. Such long distance echoes with delays in the magnitude of up to 640 ms can occur, for example, during continental long distance telephone calls or in intercontinental connections. Just a satellite transmission of a signal from one continent to another usually amounts to approximately 250 ms. By the time such a long distance echo is received by the original sender, he has already progressed markedly in his speech so that the echo effect is especially disturbing. Similarly long delays can occur when a speech signal undergoes strong compression and decompression, or if it must be delayed parallel to a compressed image transmission, in order to retain lip synchronicity.

Figure 2:
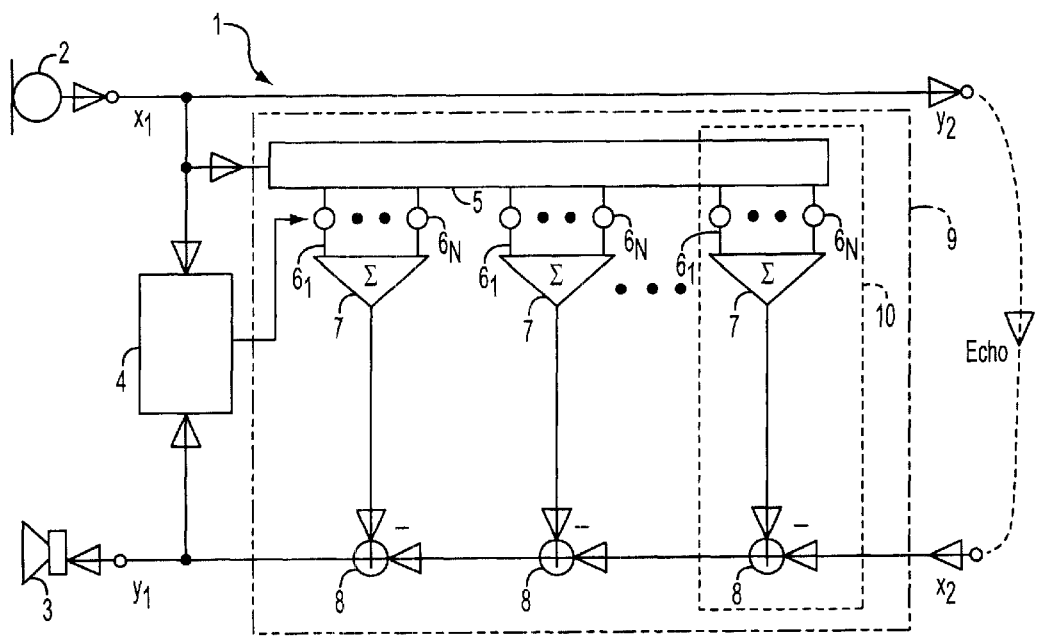
FIG. 2 is a diagrammatic representation of a simple design of the equipment in accordance with this invention, with only one TC channel to be served.

In order to suppress such echoes, equipment is used in which the adaptive FIR (=Finite Impulse Response) filter copies the echoes and then extracts them from the echo-laden useful signal. A diagram of such equipment 1 for servicing a TC channel is presented in FIG. 2. The near end outgoing signal $x_1$ is sent out from microphone 2 of a TC end device and arrives at a distant user as outgoing signal $y_2$. In addition to the signal transmitted from the distant user, an echo signal consisting of several partial echoes is also coupled into the received signal $x_2$ on the backward channel to loudspeaker 3 of the TC end device, which is then treated by the echo suppression equipment and is sent to loudspeaker 3 as incoming useful signal $y_1$.

In order to be able to reproduce a realistic echo signal, a test signal can be sent out on the line to location $y_2$, whose effect accelerates the convergence of an NLMS algorithm for the calculation of the coefficients. In a computer, especially a digital signal processor (=DSP) 4, the suitable coefficients are calculated from the echo answer with help of the NLMS algorithm N for reproducing the echo, which are input to the actual equipment for echo subtraction, which in accordance with the present invention is implemented on an ASIC (=Application Specific Integrated Circuit) 9. In the time demultiplex, sample values coming from the actual speech signal of the TC channel are input in delay line 5, which is usually executed as a shift register. Furthermore, selected sample values are input from the shift register to ASIC 9. In N demultiplex units $6_1$ through $6_N$, the product of the corresponding sample values is then formed from the delay line 5 with the coefficient supplied by DSP 4, the corresponding sum of this product is then calculated in addition to unit 7 for each of the partial echoes and, with the help of negative adders 8, are removed at location $x_2$ from the incoming useful signal, which is initially laden with the whole line echo, so that the signal which is essentially free of echoes is transmitted to the TC channel at location $y_1$.

According to the demands for the quality of echo suppression, provisions must be made for a more or less large number n of FIR partial filters 10 within the ASIC 9, each of which reproduces a partial echo with the help of accordingly large numbers of coefficients and withdraws it from the useful signal. If the temporal width of a partial echo with $\Delta t \leq 7$ ms is assumed as illustrated in the lower part of FIG. 1, a number of N=56 coefficients is required for the exact reproduction of each partial echo at a processing speed of 125 ms (equaling 8 kHz) per partial echo. Cascading a corresponding number of homogeneous FIR partial filters 10 on the ASIC 9 then allows for the consideration of a corresponding number of partial echoes. At present, network operators demand a suppression of three to five partial echoes per whole echo.

Figure 3A:
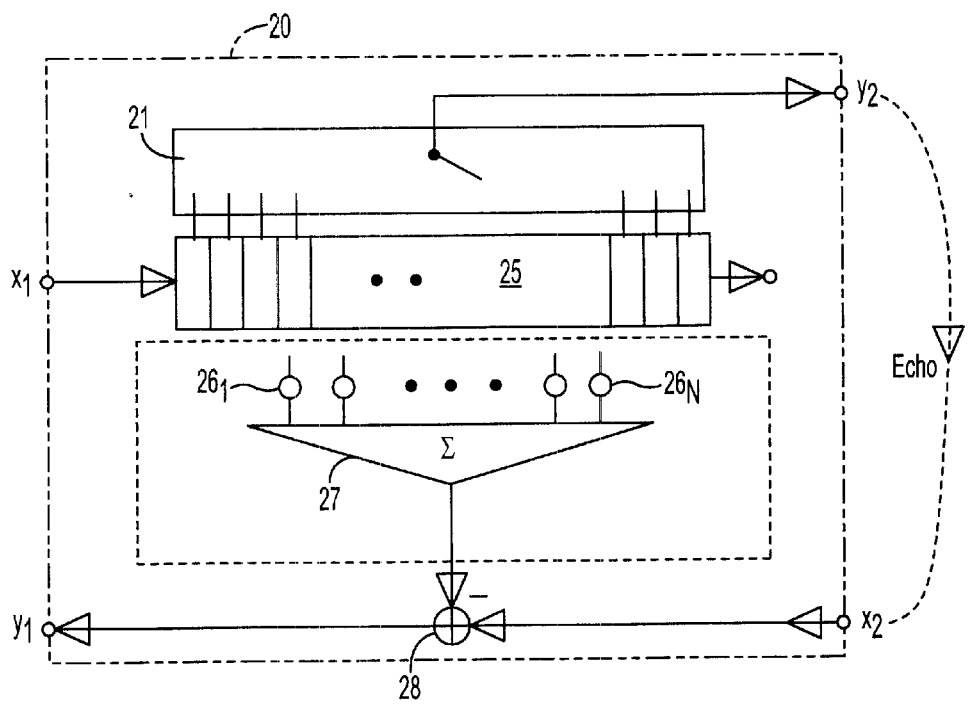
FIG. 3a shows a macrocell for a partial FIR filter.

The various FIR partial filters 10 can each be designed as macrocells on the ASIC. FIG. 3a shows a diagram of such a macrocell 20. The macrocell 20 contains a shift register 25 whose effective length is adjustable with demultiplex equipment 21, into which the sampled values of the current speech signals are input via $x_1$. An additional unit adds up the sample values weighted with the corresponding coefficients from the N multiplication equipment $26_1$ to $26_N$, and a negative adder 28 subtracts the reproduced partial echoes of the echo-laden useful signal attained in this way on line $x_2$-$y_1$.

Figure 3B:
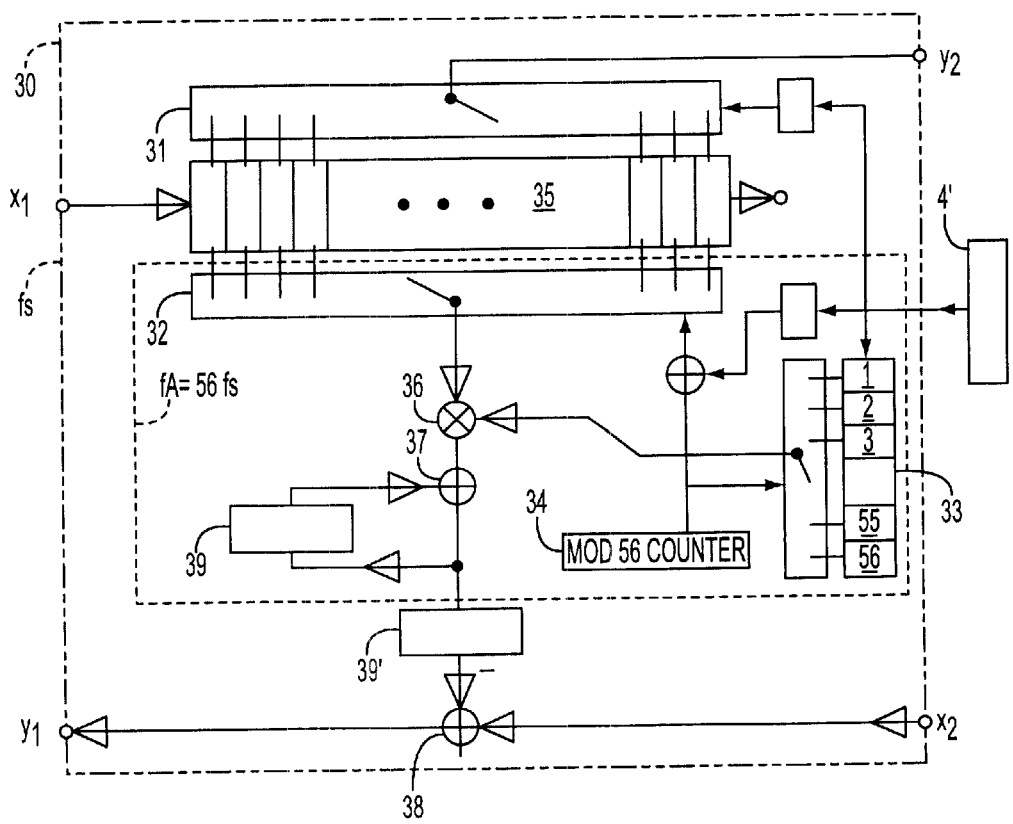
FIG. 3b shows a concrete advanced design of the macrocell in accordance with FIG. 3a with readable coefficient memory for a TC channel in the multiplex process.

In FIG. 3b, a practical development of the macrocell 20 in accordance with FIG. 3a is shown. The macrocell 30 includes a coefficient memory 33 for N coefficients as approximated by a digital signal processor 4', which can be directly read by a modulo N counter (in the example shown here, a modulo 56 counter) 34. In this way, only one single multiplication unit 36 is required, to which the corresponding coefficients from the coefficient memory 33 are input for multiplication, along with the corresponding sample values from the shift register 35 at an operating frequency of $f_A = N \cdot f_S$, whereby the sample results are stored in the shift register 35 at a sampling frequency of $f_S$. On the other hand, the shift register 35 is set to its effective length with the initial demultiplex equipment 31 and is read with the second demultiplex equipment 32 in time with the modulo N counter 34.

The product value from the sample value and corresponding coefficients output by the multiplication unit 36 is fed to an adder 37, which adds it to the sum of the preceding product values, each of which is stored in an initial temporary memory 39 via a feedback loop and finally the partial echo signal reproduced in this way is stored in a second temporary memory 39'. This partial echo signal is extracted from the echo-laden useful signal on the TC line by a subtraction unit (or a negative adder) 38 on the stretch $x_2$-$y_1$.

Figure 4:
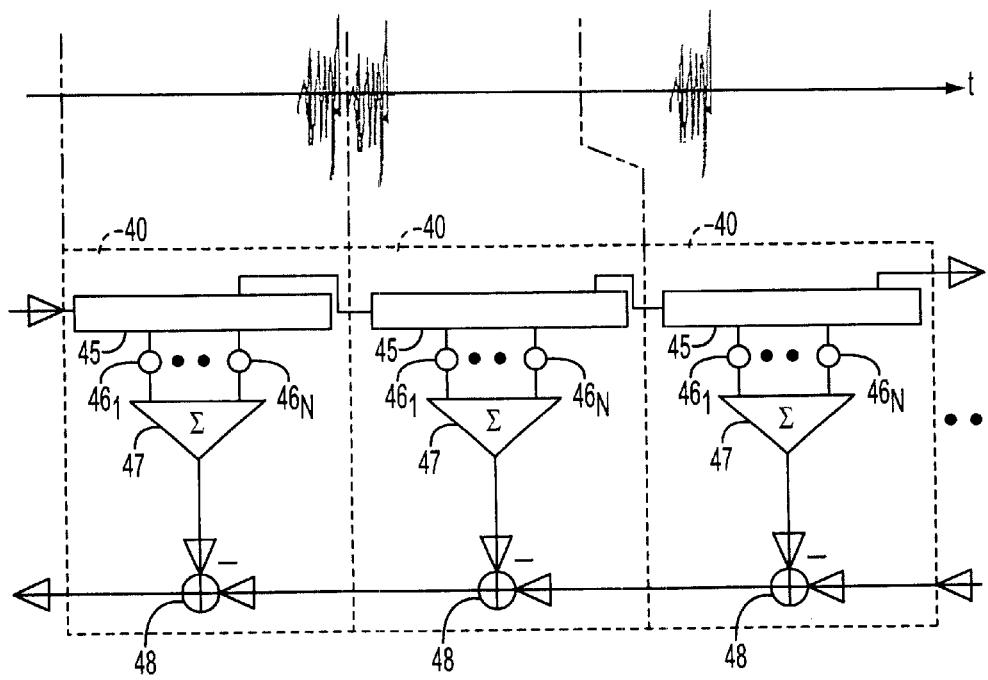
FIG. 4 is a diagrammatic representation of cascaded macrocells in accordance with FIG. 3a and 3b, in which the temporal course of partially very closely neighboring partial echoes is represented in the upper part of the figure.

As shown in the diagram in FIG. 4, several essential macrocells 40 of the same design can be arranged as a cascade in the ASIC with shift register 45, multiplication unit $46_1$ to $46_N$, an additional unit 47 and subtraction unit 48. The production costs of the ASIC can be decreased considerably through the identical construction of the macrocells 40. In addition, the processing capacity of the ASIC can be better exploited through the flexible interconnection of the macrocells 40. Therefore, a variable subset of the FIR partial filters formed by the macrocells 40 can be assigned to each TC channel to be served as required, depending on the number of partial echoes as well as the size of the delay times. A channel with few partial echoes and/or small delay times consequently "uses" a smaller number of FIR partial filters than a channel with many partial echoes.

Figure 5A:
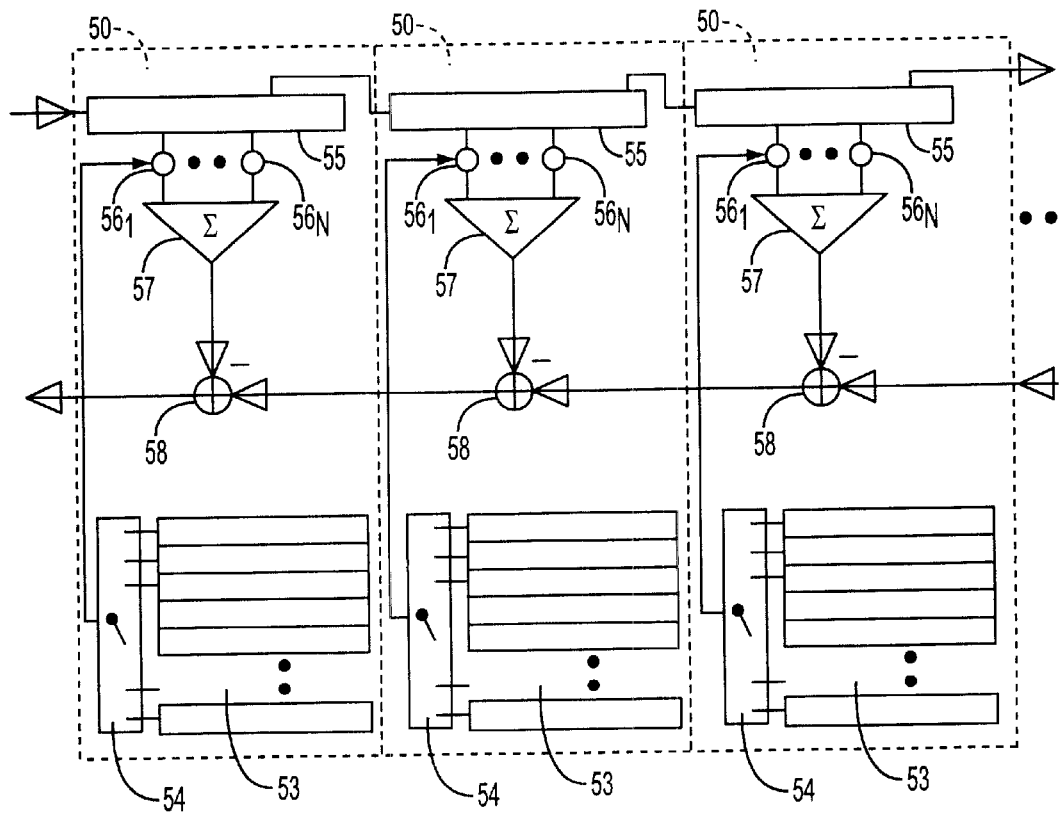
FIG. 5a shows another design with cascaded macrocells coefficient memory readable in the multiplex mode for the time demultiplex processing of m TC channels.

Another design of the equipment in accordance with this invention is illustrated in FIG. 5a, with cascaded macrocells 50 of essentially the same design, each of which in turn contains a shift register 55, N multiplication units $56_1$ to $56_N$, an additional unit 57 and a subtraction unit 58. This order is designed for the time demultiplexing of m TC channels. In this case the shift register 55 has a length increased by the factor m, for example. The selection of the matching sample values must now take into account the temporal nesting of the sample values of the m TC channels in the shift register 55.

Furthermore, the macrocells 50 also contain a coefficient memory 53 containing N coefficients, which can be read by the demultiplexer 54. The coefficient values are fed to the corresponding multiplication units $56_1$ to $56_N$ and are multiplied there by the respective sample values from the shift register 55 and added in the adder 57 to the corresponding reproduced echo signal which is to be extracted from the useful signal in the subtraction unit 58.

Figure 5B:
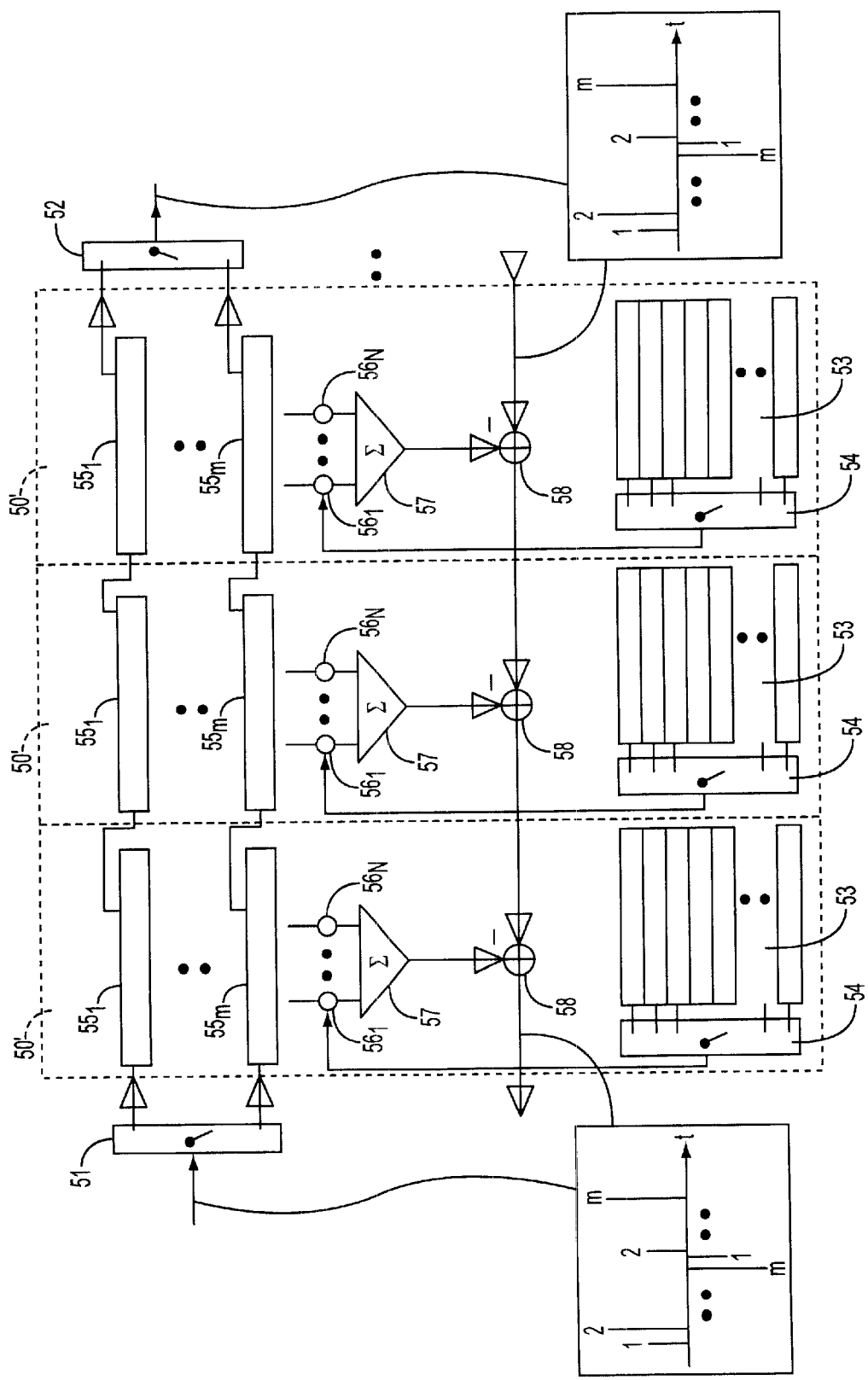
FIG. 5b shows a design of cascaded macrocells and a demultiplexed shift register arrangement for the incoming sample values of different, independent TC channels.

FIG. 5b shows a variation of the equipment in accordance with the present invention with cascading macrocells 50', which differ from the macrocells 50 in FIG. 5a in that instead of having a single shift register 55, they have a number of shift register $55_1$ to $55_m$, corresponding to the number m of parallel, independent TC channels to be serviced. These are fed via a demultiplex unit 51 positioned at the beginning, with corresponding sample values from the outgoing near-end signal, which can be re-combined by means of a demultiplex unit 52 positioned at the outgoing end. The temporal course of the m sample values corresponding to the m TC channels is represented as a diagram in the two left and right boxes at the lower portion of FIG. 5b. In this way, a corresponding coefficient memory 53 can be assigned to each of the m TC channels to be serviced. The echo suppression takes place on all m TC channels via single whole filter composed of several FIR partial filters, which can be switched to the multiplex mode.

Figure 6:
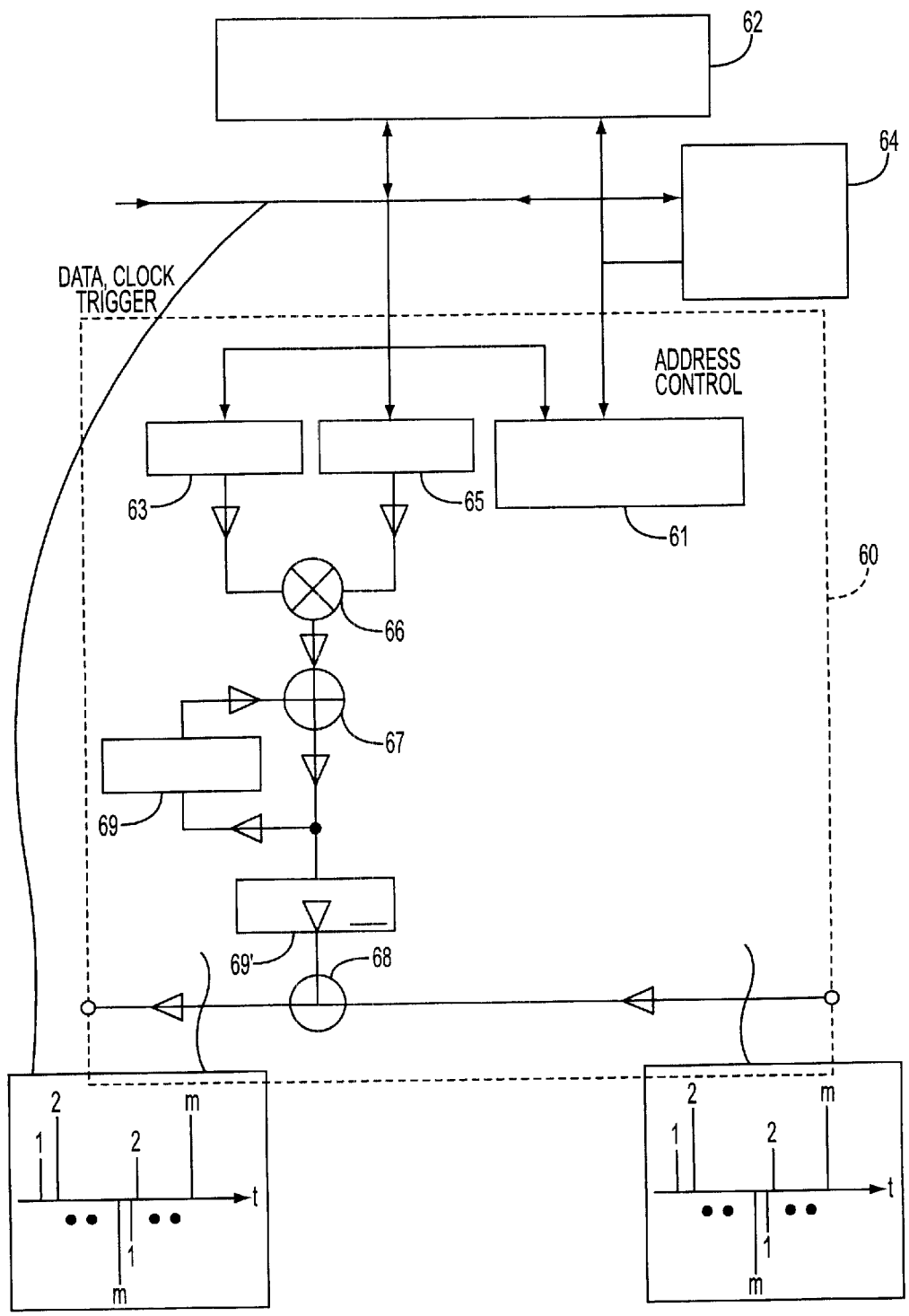
FIG. 6 shows a design in which the coefficient memory and sample value memory are stored on a RAM unit and the course of the reproduced partial echo for the various TC channels is essentially controlled by a control unit on the ASIC.

Finally, FIG. 6 shows another, especially compact design of the equipment in accordance with the present invention, in which a control unit 61 is integrated on the ASIC 60, which controls the course of the echo suppression process by means of an address calculation of memory data in a storage unit 62 removed from storage on a RAM, and by controlling the reading, sorting and selecting processes between the storage unit 62, the digital signal processor 64 and the filter elements integrated on the ASIC 60. The FIR partial filters in this design include a single multiplication unit 66, to which the coefficients, controlled by the control unit 61 in the time demultiplexing procedure via an initial buffer memory 63 and via another buffer memory 65 the proportionate sample value is fed from the storage device to produce the product. The sample values weighted with the coefficients are finally added in an adder 67 via a feedback loop to the totals of the preceding products that were stored temporarily in the temporary memory 69. The partial echo reproduced in this way is stored in a second temporary memory 69' and then extracted from each of the attached received echo-laden useful signals by means of a subtraction unit 68.

On the other hand, the temporal course of the signal sample values from the m independent TC channels is represented as a diagram in the two boxes on the left and right side in the lower portion of the picture.

The design shown in FIG. 6 requires extremely little hardware. The digital signal processor 64 is significantly relieved of its burden and is essentially only used to calculate the coefficients while all of the control processes are executed by the control unit 61 on the ASIC 60. The ASIC 60, on the other hand, is relieved of the burden of complex storage functions, in that the coefficients and sample values are stored on the external RAM memory 62, which is especially inexpensive as a standard electronic component and which is available with a high storage capacity. In addition, it replaces the function of the shift register in the aforementioned design. The function of the multiplexer for reading the coefficient memory, as they are designed in the examples shown in FIGS. 3b, 5a and 5b, is replaced by a simple address calculation and corresponding approximation of the reading in, and selection process by, the control unit 61.

In designs of the equipment in accordance with the present invention for echo suppression not depicted here, there can also be equipment for the recognition of non-speech signals on one of the TC channels to be serviced, especially for the detection of modem or fax signals, which enables the echo suppression equipment to be automatically switched off, which increases the stability of the modem connection.

Furthermore, a compander circuit can also be included for the combined suppression and masking of the line echoes, which preferably will be realized on the same ASIC as the FIR filter. This would improve the echo suppression function even further.

The above mentioned test signals for attaining the coefficients suitable for reproducing the echo on the corresponding TC channel can include Dirac impulses, analog Gaussian noise signals, preferably limited to the width of the TC channels to be serviced, or synthetic, preferably ternary pseudo noise sequences. The coefficients for reproducing the echo are preferably attained through a correlation of the previously sent out echo signals to those which are received and directly with the help of the NLMS (=Normalized Least Mean Square) algorithm.

What is claimed is:

1. Equipment for the suppression of whole echo composed of several partial echoes in telecommunications (TC) equipment, such as end devices, transmission systems or switching equipment, with the help of adaptive FIR (=Finite Impulse Response) filters, which reproduce the whole echo and extract it from the echo-laden useful signal and which has been transferred to the respective TC equipment, wherein n FIR filters or n partial echo FIR filters of the same design, each of which are able to reproduce a whole echo or partial echo, are implemented on a single ASIC (=Application Specific Integrated Circuit) for the m parallel and independent TC channels to be served;

the whole echo or partial echoes to be reproduced can be calculated in real time in the ASIC; and a digital signal processor is designed to control the ASIC and set filter settings, especially after the coefficient in the ASIC required to reproduce the echo is calculated in the digital signal processor.

2. Equipment in accordance with claim 1, in which a number of partial echo FIR filters are cascaded in order to reproduce a whole echo.

3. Equipment in accordance with claim 1, in which a variable subset of the partial echo FIR filters can be assigned to each of the TC channels to be served, as required, depending on the number of partial echoes as well as the size of the delay times.

4. Equipment in accordance with claim 2, in which there are provisions for a macrocell for each partial echo FIR filter in the ASIC. This macrocell includes a shift register of suitable length for the temporary storage of sampled speech signals, demultiplexer equipment for setting the effective shift register length, as well as adding equipment for the summation of the sample value weighted with the appropriate coefficients.

5. Equipment in accordance with claim 4, in which a macrocell including one of the coefficient memories approximated by the digital signal processor, which can be directly read by a modulo N counter, as well as a digital multiplier unit with an operating frequency of $f_A = N \sim f_S$ to which the appropriate coefficients from the coefficient memory and the appropriate sample values from the shift register are fed for multiplication, in which case the sample values with a sampling frequency $f_S$ have been stored in the shift register. The invention includes an adder, in which the product put out by the multiplier unit is added to each of the sums of the previous product values stored in the temporary memory via a feedback loop and which can finally be extracted from the echo-laden useful signal, which has been stored in a second temporary memory as the reproduced partial echo signal and transmitted to the TC equipment.

6. Equipment in accordance with claim 4, in which several macrocells, preferably of the same design, are arranged in a cascade in the ASIC.

7. Equipment in accordance with claim 1, several coefficient memories, which can all be read by means of a demultiplexer, whereby each of the TC channels to be served can be assigned appropriate coefficient memory, and in which the suppression of echoes on all TC channels can take place via a single whole echo FIR filter consisting of several partial echo FIR filters, which can be switched to the multiplex mode.

8. Equipment in accordance with claim 1, in which there is a storage device, preferably a RAM (=Random Access Memory), in which the current sampled speech signals which have been transmitted from the TC equipment can be stored, as well as the coefficients belonging to the reproduced partial echoes, and in which there is a control unit, preferably integrated into the ASIC, which controls the process of echo suppression by means of an address calculation of data stored in the storage unit and approximations of the reading in and sorting processes between the storage unit, the digital signal processor and the partial echo FIR filters on the ASIC.

9. Equipment in accordance with claim 8, in which the equipment in the time multiplexing process m can serve independent TC channels.

10. Equipment in accordance with claim 1, in which there is also equipment for the recognition of non-speech signals on a TC channel, especially for the detection of modem or fax signals.

11. Equipment in accordance with claim 10, in which a discreet Fourier transformation (=\DFT), especially a Goertzel algorithm, is implemented on the equipment for the recognition of non-speech signals.

12. Equipment in accordance with claim 1, in which there is also a compander circuit for masking line echoes.

13. Equipment in accordance with claim 12, in which a compander circuit is realized on an ASIC, preferably on the same ASIC as the FIR filter.

14. A process for operating equipment in accordance with claim 1, in which a Dirac impulse is sent to the corresponding TC channel, the echo answer on it is detected and the suitable coefficients for reproducing the whole echo are calculated and stored for the corresponding FIR filter.

15. A process in accordance with claim 14, in which the coefficients for reproducing the echo are attained from the correlation of the echo signals which have been sent to those which have been received.

16. A process in accordance with claim 14, in which a Normalized Least Mean Square (=NLMS) algorithm is used to calculate the filter coefficients for the calculation of the coefficients from the received echo signals in the knowledge of the signals sent out.

17. A process in accordance with claim 14, in which the whole echo composed of all the partial echoes to be considered is put together on the ASIC and is extracted as a whole from the useful signal transmitted to the TC equipment.

18. A process in accordance with claim 14, in which the partial echoes to be considered are reproduced in the ASIC and individually extracted from the useful signal transmitted to the TC equipment.

19. A process for operating equipment in accordance with claim 1, in which a defined analog noise signal sequence is sent to the corresponding TC channel, the echo answer on it is detected and the suitable coefficients for reproducing the whole echo are calculated and stored.

20. A process in accordance with claim 19, in which the analog noise signal sequence preferably includes a Gaussian noise signal limited to the bandwidth of the TC channels to be served.

21. A process for operating the equipment in accordance with claim 1, in which a synthetic, preferably ternary pseudo-noise sequence is sent to the corresponding TC channel, the echo answer is detected and the suitable coefficients for reproducing the whole echo are calculated and stored.

* * * * *